US009792707B2

(12) United States Patent
Kishikawa et al.

(10) Patent No.: US 9,792,707 B2
(45) Date of Patent: Oct. 17, 2017

(54) THREE-DIMENSIONAL IMAGE OUTPUT DEVICE AND BACKGROUND IMAGE GENERATION DEVICE

(71) Applicant: GEO TECHINICAL LABORATORY CO., LTD., Fukuoka-shi, Fukuoka (JP)

(72) Inventors: Kiyonari Kishikawa, Fukuoka (JP); Eiji Teshima, Fukuoka (JP); Masatoshi Aramaki, Fukuoka (JP); Masashi Uchinoumi, Fukuoka (JP); Masaru Nakagami, Fukuoka (JP); Tatsuya Azakami, Fukuoka (JP)

(73) Assignee: Geo Technical Laboratory CO., LTD, Fukuoka-shi (JP)

( * ) Notice: Subject to any disclaimer, the term of this patent is extended or adjusted under 35 U.S.C. 154(b) by 0 days.

(21) Appl. No.: 14/860,572

(22) Filed: Sep. 21, 2015

(65) Prior Publication Data

US 2016/0012627 A1 Jan. 14, 2016

Related U.S. Application Data

(63) Continuation of application No. PCT/JP2014/001531, filed on Mar. 18, 2014.

(30) Foreign Application Priority Data

Mar. 25, 2013 (JP) .................................. 2013-061214

(51) Int. Cl.
*G06T 11/60* (2006.01)
*G06T 17/05* (2011.01)
(Continued)

(52) U.S. Cl.
CPC .......... *G06T 11/60* (2013.01); *G01C 21/3638* (2013.01); *G06T 17/05* (2013.01);
(Continued)

(58) Field of Classification Search
CPC ...... G06T 11/60; G06T 17/05; G06T 2215/16; G06T 2219/2012; G01C 21/3638;
(Continued)

(56) References Cited

U.S. PATENT DOCUMENTS 5,515,077 A 5/1996 Tateyama
5,757,290 A 5/1998 Watanabe et al.
(Continued)

FOREIGN PATENT DOCUMENTS

EP 0660290 A1 6/1995
EP 0738876 A2 10/1996
(Continued)

OTHER PUBLICATIONS

Search Report dated Jun. 17, 2014 from International Application No. PCT/JP2014/001531.
(Continued)

*Primary Examiner* — Ke Xiao
*Assistant Examiner* — Kim-Thanh T Tran
(74) *Attorney, Agent, or Firm* — Beyer Law Group LLP

(57) ABSTRACT

A projection (projected image) is drawn by perspective projection of a three-dimensional model with a background image having improved reality. When a sightline of the perspective projection looks down from above, the projected image is drawn into an object drawing area which is a lower part of an image picture. A background layer representing the stratosphere is separately generated by two-dimensionally drawing a background image, in which the stratosphere (hatched area) is opaque, while the remaining area is transparent. The boundary between the opaque portion and the transparent portion forms a curved line that is convex upward to express a curved horizon. The background layer is superimposed in front of the projected image, not behind the projected image, thereby covering an upper edge portion
(Continued)

of the projected image including a straight-lined upper edge, so as to provide a curved boundary realizing a curved pseudo horizon in the image picture.

5 Claims, 12 Drawing Sheets

(51) Int. Cl.
| | | |
|---|---|---|
| *H04N 5/272* | (2006.01) | |
| *G09B 29/00* | (2006.01) | |
| *H04N 9/04* | (2006.01) | |
| *G01C 21/36* | (2006.01) | |
| *G06F 3/01* | (2006.01) | |

(52) U.S. Cl.
CPC ......... *G09B 29/005* (2013.01); *H04N 5/272* (2013.01); *H04N 9/045* (2013.01); *G06F 3/013* (2013.01); *G06T 2215/16* (2013.01); *G06T 2219/2012* (2013.01)

(58) Field of Classification Search
CPC ...... H04N 9/045; H04N 5/272; G09B 29/005; G06F 3/013
USPC ........................................................ 345/419
See application file for complete search history.

(56) References Cited

U.S. PATENT DOCUMENTS

| | | | |
|---|---|---|---|
| 9,135,743 B2* | 9/2015 | Bailiang | G06T 15/10 |
| 2001/0053004 A1* | 12/2001 | Nishikawa | G02B 5/0252 |
| | | | 359/15 |
| 2002/0149586 A1 | 10/2002 | Maeda et al. | |
| 2003/0025615 A1 | 2/2003 | Kato et al. | |
| 2005/0251754 A1* | 11/2005 | Padgett | G06F 3/0481 |
| | | | 715/779 |
| 2007/0019840 A1 | 1/2007 | Fujiwara et al. | |
| 2012/0019513 A1 | 1/2012 | Fong et al. | |
| 2013/0057550 A1* | 3/2013 | Kishikawa | G01C 21/3638 |
| | | | 345/420 |
| 2013/0121569 A1* | 5/2013 | Yadav | G06T 5/50 |
| | | | 382/164 |
| 2014/0267257 A1* | 9/2014 | Overbeck | G06T 17/05 |
| | | | 345/422 |

FOREIGN PATENT DOCUMENTS

| | | |
|---|---|---|
| JP | 1994-180742 | 6/1994 |
| JP | 2002-311821 | 10/2002 |
| JP | 2007-140842 | 6/2007 |

OTHER PUBLICATIONS

European Search Report dated May 8, 2016 from European Application No. 14774190.4.

* cited by examiner

THREE-DIMENSIONAL IMAGE OUTPUT DEVICE AND BACKGROUND IMAGE GENERATION DEVICE

CLAIM OF PRIORITY

This application is a Continuation of International Patent Application No. PCT/JP2014/001531, filed on Mar. 18, 2014, which claims priority to Japanese Patent Application No. 2013-061214, filed on Mar. 25, 2013, each of which is hereby incorporated by reference.

BACKGROUND OF THE INVENTION

1. Field of the Invention

The present invention relates to a technology of outputting a three-dimensional image, in which a background image is superimposed on an image expressing an object three-dimensionally.

2. Description of the Related Art

Three-dimensional maps that three-dimensionally express features such as buildings and roads have become used widely. Bird's eye views that look down features in a wide area obliquely from above have also recently become popular. Such a three-dimensional map is often drawn by perspective projection of a three-dimensional model placed on the flat ground surface. A variety of techniques have been proposed to display a distant view image such as the mountains, the sky and the clouds, with respect to such a three-dimensional image. A technique has also been used to superimpose a foreground image layer provided separately from an image drawn by perspective projection on the image.

The technique described in Japanese Patent Laid-Open Application No. JP 2007-25362A draws a background image located behind a display area of roads and buildings, based on a distant view pattern provided in advance with respect to each orientation area.

BRIEF DESCRIPTION OF THE INVENTION

The three-dimensional map is displayed in various display scales, so that drawing according to the display scale is desired. In the case of display of a wide area on a global scale, for the purpose of improving the reality, it is preferable to draw a background showing the stratosphere and express the horizon by a curved line. A bird's eye view in which the horizon is expressed by a curved line may be obtained by application of a sphere model that expresses the shape of the earth as a sphere or by application of an earth ellipsoid model that expressed the shape of the earth as an earth ellipsoid.

Such display, however, needs to provide both a three-dimensional model for the flat ground surface and a three-dimensional model for the spherical ground surface or undesirably increases the processing load of operations to express the horizon by a curved line. The three-dimensional map may accordingly have a problem of remarkably increasing the data volume or the processing load in an attempt to improve the reality of the drawn background as described above. This problem is not limited to the three-dimensional map but is commonly found in the configuration of outputting a three-dimensional image.

In order to solve the problems described above, an object of the invention is to improve the reality of a drawn background while suppressing an increase in processing load in output of a three-dimensional image in which an object is drawn three-dimensionally, along with a background image.

The invention may be implemented by any of the following aspects and embodiments, in order to solve at least part of the above problems.

According to a first aspect of the invention, there is provided a three-dimensional image output device that outputs a three-dimensional image in which an object is drawn three-dimensionally. The three-dimensional image output device comprises: a three-dimensional model storage that stores a three-dimensional model representing a three-dimensional shape of the object; a projecting section that uses the three-dimensional model and generates a three-dimensional object image that expresses the object three-dimensionally; a background layer generating section that generates a background layer, in which a background image of the three-dimensional image is drawn to have a transparent portion and an opaque portion; and an image output controller that superimposes the background layer on a front surface of the three-dimensional object image to generate the three-dimensional image and outputs the three-dimensional image. At least one of a generating condition of the three-dimensional object image and a generating condition of the background layer is adjusted to cause the opaque portion to cover and hide part of the three-dimensional object image.

The three-dimensional image may be output in various aspects, for example, displayed on a display unit and output as a printed matter.

The three-dimensional image output device in accordance with one embodiment of the invention superimposes the background layer on the front surface of the three-dimensional object image. The background layer is originally a layer showing the background of a three-dimensional object image, i.e., a layer showing an image to be drawn at a greater distance than the three-dimensional object image. The background layer should thus be fundamentally located behind the three-dimensional object image. The embodiment of the invention, however, dares to locate the background layer on the front surface of the three-dimensional object image. The background layer has the transparent portion, so that the three-dimensional object image is visible even when the background layer is located on the front surface of the three-dimensional object image. The background layer has the opaque portion to cover and hide part of the three-dimensional object image. Covering and hiding part of the three-dimensional object image with the opaque portion enables an image that is fundamentally implemented using complicated coordinate conversion or a special three-dimensional model to be expressed by a pseudo-image. Accordingly the invention enables a variety of backgrounds to be output with the improved reality, while suppressing increases in data volume and processing load in the process of outputting a three-dimensional image, in which an object is drawn three-dimensionally, along with a background image.

According to one embodiment of the invention, the background layer may be generated by any of various methods. One available method may provide in advance background image data including a transparent portion and an opaque portion and draw the background image data on a two-dimensional layer provided separately from a projection plane of a three-dimensional object image to generate a background layer. Another available method may provide background data representing a background image, define a transparent portion and an opaque portion on a two-dimensional layer according to a drawn three-dimensional object image, and draw the opaque portion using the background data to generate a background layer.

According to an example of the three-dimensional image output device, the three-dimensional model may be map data representing three-dimensional shapes of ground surface and features, and the three-dimensional image may be a three-dimensional map that expresses a geographical shape three-dimensionally.

The three-dimensional map has an extremely large volume of data and needs to output various backgrounds in order to improve the reality. The three-dimensional map may additionally need to be displayed in real time or need to be displayed on a terminal of relatively low throughput, such as a handheld terminal. The embodiment of the invention is thus especially effective for the three-dimensional map to draw various backgrounds while suppressing increases in data volume and processing load.

According to another example of the three-dimensional image output device, the background image may have the opaque portion, which shows the stratosphere of the earth, in an upper part of the background image and the transparent portion in a lower part of the background image, and a boundary between the transparent portion and the opaque portion is expressed by a circular arc or an elliptical arc connecting a left side and a right side of the background image. The projecting section may generate the three-dimensional object image having the part covered and hidden by the opaque portion from a viewpoint position where a horizon is to be recognized as a curved line.

This achieves pseudo-expression of the horizon by the curved line in output of a three-dimensional map including the stratosphere as the background without describing the ground surface and the features by a sphere model or an earth ellipsoid model and without performing any complicated operations.

According to another embodiment of the three-dimensional image output device, the background image may include a transparent gradation area that gradually changes transmittance of an image on a boundary between the transparent portion and the opaque portion.

This blurs the boundary between the background image and the three-dimensional object image transmitted through the transparent portion and reduces the unnaturalness in the area where the three-dimensional object image is covered with the opaque portion. This also provides a visual effect of blurring the objects at a great distance. The width of the transparent gradation area may be changed, for example, according to the scale of the three-dimensional map, in such a range that provides the above visual effect. In the transparent gradation area, not only the transmittance but the color of the background image may be changed.

According to a second aspect of the invention, there is provided a background image generation device that generates a background image which is to be superimposed in output of a three-dimensional image in which an object is drawn three-dimensionally, wherein the background image includes a transparent portion that causes an image to be transmitted and an opaque portion that does not cause an image to be transmitted. The background image generation device comprises: an object drawing range input section that inputs information specifying an object drawing range in which the object is drawn, in a three-dimensional object image that expresses the object three-dimensionally and is generated as an image, on which the background image is to be superimposed; a background specifying information input section that inputs background specifying information specifying a content of a background of the three-dimensional object image in the three-dimensional image; and a background image generator that generates the background image including the opaque portion configured to cause part of the object drawing range to be covered and hidden by the specified background and a residual area of the opaque portion specified as the transparent portion.

As described above, the background layer generated by the three-dimensional image output device in accordance with one embodiment of the invention may be generated by using background image data provided in advance to have a transparent portion and an opaque portion or may be newly generated as a background image having a transparent portion and an opaque portion according to the three-dimensional object image. The background image generation device in accordance with one embodiment of the invention may be configured as a separate device from the three-dimensional image output device and may be used as the device to generate the background image data of the former embodiment in advance. The background image generation device may alternatively be configured to be operable in cooperation with the three-dimensional image output device and may be used as the device to generate the background image of the latter embodiment according to the three-dimensional object image at the time of output.

The background image generation device of the invention appropriately and flexibly generates the background image used in the three-dimensional image output device described above, based on the object drawing range in the three-dimensional object image and the background specifying information.

The "content of the background" according to the invention means the type of an image to be drawn as the background, for example, the stratosphere or under the sea. The content of the background may be specified, for example, by selection among menu options provided in advance.

A method of generating the background image of the specified content may store original background image data, in which the entire image is specified as an opaque portion, and replace part of this original background image data with a transparent portion. In the case of a relatively simple background, for example, a background expressed by a single color or a background expressed by changing the shape or the color regularly or irregularly, the background image may be generated by drawing the image of an opaque portion in a color and a shape according to the specified content.

The invention may not necessarily include all the features described above but may be configured appropriately with partial omission or by combination of these features. The invention is not limited to the configurations of the three-dimensional image output device and the background image generation device described above but may be configured as any of various other aspects: for example, a three-dimensional image output method, a background image generation method, computer programs that implement the functions of these methods; non-transitory storage media in which such computer programs are stored; and data signals that include such computer programs and are embodied in carrier waves. Any of various additional components described above may also be applied to any of the respective aspects.

When one embodiment of the invention is configured as a computer program or as a non-transitory storage medium in which such a computer program is stored, the configuration may include the entire program that controls the operations of the three-dimensional image output device or the background image generation device or may include only a section that achieves the functions of the embodiments of the invention. Available examples of the storage medium include flexible disks, CD-ROMs, DVD-ROMs, magneto-optical disks, IC cards, ROM cartridges, punched cards, prints with barcodes or other codes printed thereon, internal storage units (memories such as RAM and ROM) and external storage units of computers and various other computer-readable media.

DETAILED DESCRIPTION OF EMBODIMENTS OF THE INVENTION

Embodiments

The following describes embodiments in which the device of the invention is applied to a three-dimensional map display system according to some aspects of the invention. In the description below, the respective devices constituting the three-dimensional map display system are connected by a local area network (LAN). The respective devices may alternatively connected by another network such as the Internet.

A. First Embodiment

A1. Three-Dimensional Map Display System

Figure 1:
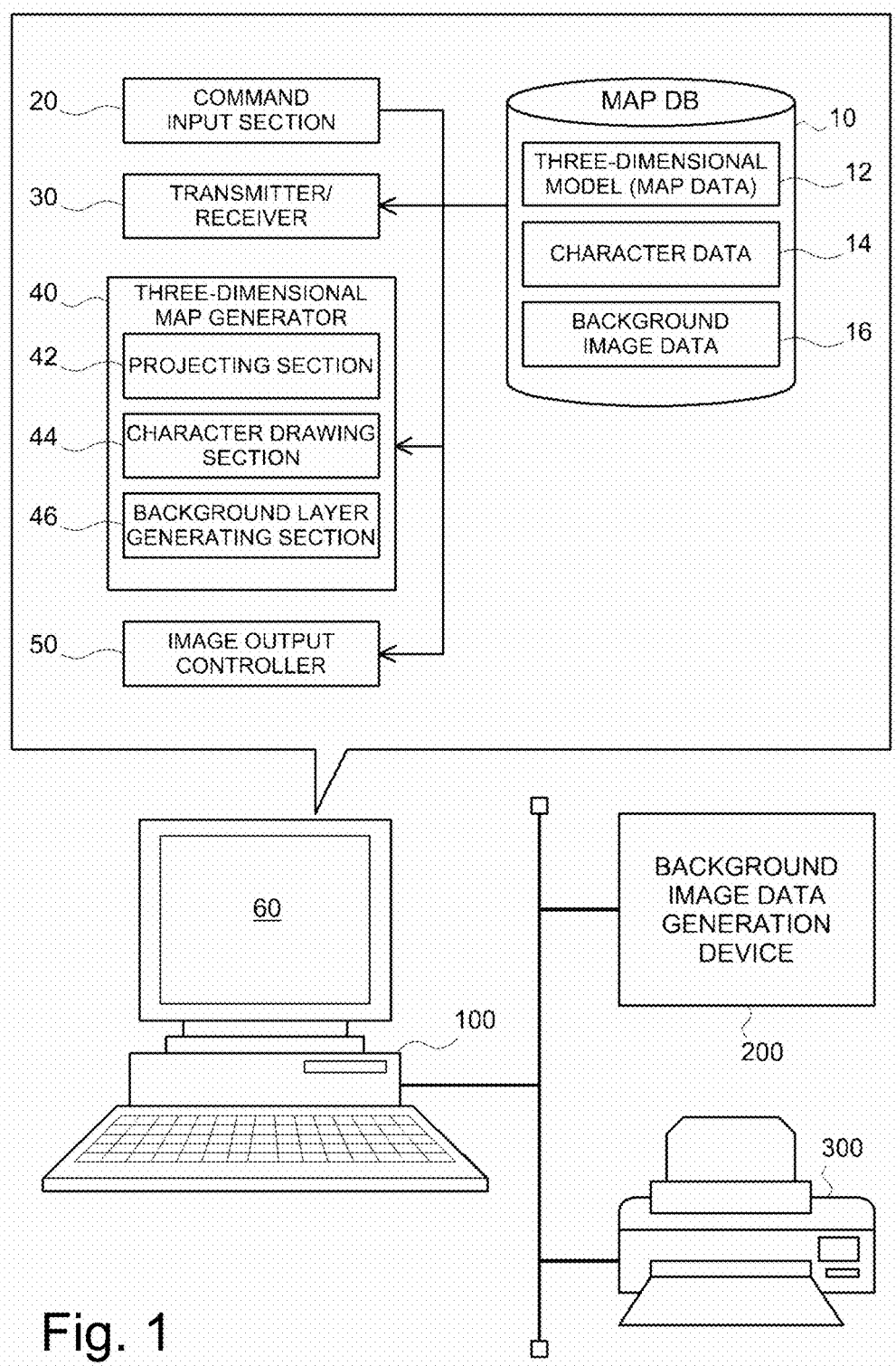
FIG. 1 is a diagram illustrating the general configuration of a three-dimensional map display system according to a first embodiment.

FIG. 1 is a diagram illustrating the general configuration of a three-dimensional map display system according to a first embodiment. As illustrated, this three-dimensional map display system includes a three-dimensional map display device 100, a background image data generation device 200 and a printer 300. In the three-dimensional map display system, the three-dimensional map display device 100 and the background image data generation device 200 may be configured integrally.

The three-dimensional map display device 100 includes a map database (DB) 10, a command input section 20, a transmitter/receiver 30, a three-dimensional map generator 40, an image output controller 50 and a display unit 60. These respective functional blocks are configured as software configuration by installing computer programs for implementing the respective functions in a personal computer including, for example, a CPU, a RAM, a ROM, a hard disk drive and a communication device. At least part of these functional blocks may alternatively be configured as hardware configuration.

The map database 10 includes a three-dimensional model 12, character data 14 and background image data 16. The map database 10 stores map data as the three-dimensional model 12. The map data are data used to generate a three-dimensional map and includes three-dimensional polygon data that three-dimensionally represent shapes of various features such as mountains, rivers, roads and buildings. According to this embodiment, the map data is described using an orthogonal coordinate system. The character data 14 are data representing characters to be drawn in the three-dimensional map, for example, the names of buildings, the names of roads and the names of intersections. Each of the character data 14 is related to each of the three-dimensional model 12 by an identifier. The character data 14 also include display positions of respective characters in the three-dimensional map, font and size of characters and data regarding the relationship between the scale of the three-dimensional map and the display/no display of characters. The map database 10 also stores data of background images generated in advance by the background image data generation device 200, as the background image data 16. The background image data 16 represent images used to generate a background layer which is to be superimposed on a projection drawn by perspective projection of the three-dimensional model 12 in the process of displaying the three-dimensional map. According to the embodiment, an image showing the stratosphere of the earth is stored as the background image.

The command input section 20 inputs the user's instructions regarding display of the three-dimensional map. The transmitter/receiver 30 sends and receives data to and from the background image data generation device 200 and the printer 300 via the LAN.

The three-dimensional map generator 40 includes a projecting section 42, a character drawing section 44 and a background layer generating section 46. The projecting section 42 uses the three-dimensional model 12 read from the map database 10 to generate a three-dimensional object image (also called projection) that three-dimensionally draws a three-dimensional model of features by perspective projection. The character drawing section 44 uses the character data 14 read from the map database 10 to draw characters on the three-dimensional object image generated by the projecting section 42. The background layer generating section 46 uses the background image data 16 read from the map database 10 to generate a background layer to be superimposed on the front surface of the three-dimensional object image. The image output controller 50 causes the resulting three-dimensional map to be displayed by the display unit 60 or to be output to the printer 300 via the transmitter/receiver 30.

The background image data generation device 200 is provided as a device that generates the background image data 16. According to the embodiment, the background image data generation device 200 is configured by a personal computer including, for example, a CPU, a RAM, a ROM, a hard disk drive and a communication device.

The background image data generation device 200 stores image data as materials for generating the background image data 16. The operator selects any of the image data to edit the selected image data to a content suitable for the background image data 16 used by the three-dimensional map display device 100. The background image data of the embodiment has a transparent portion and an opaque portion as described later. The background image data generation device 200 accordingly provides edit functions, for example, to specify part of the image data selected by the operator as a transparent portion. The background image data 16 generated by the background image data generation device 200 is sent to the three-dimensional map display device 100 via the network and is stored in the map database 10.

Figure 2A:
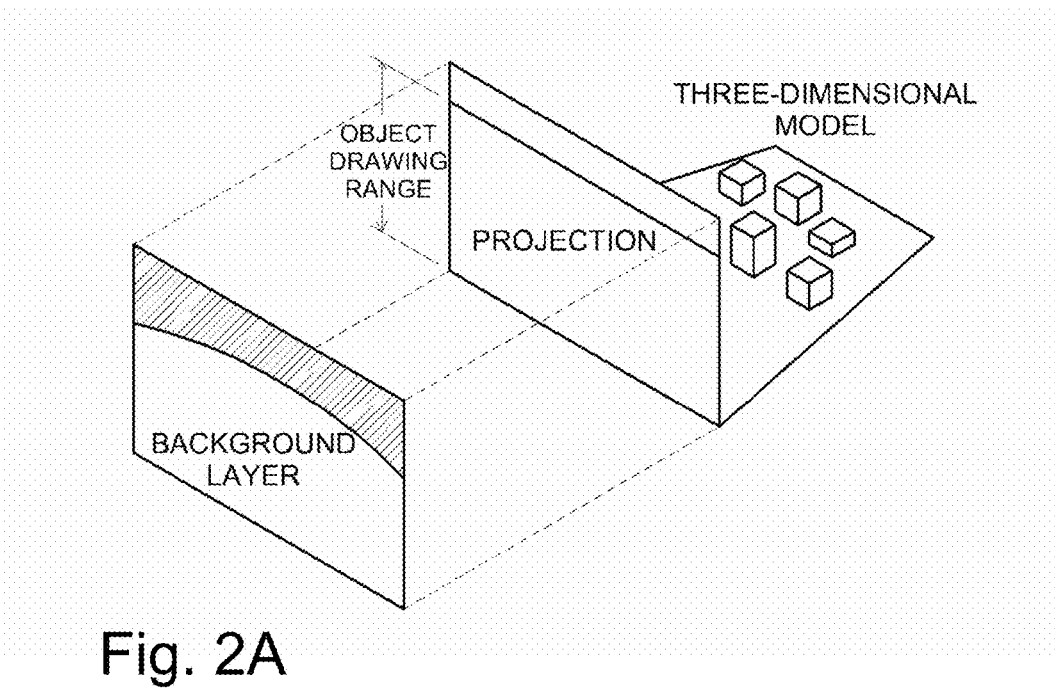
FIG. 2A is diagrams illustrating the relationship between a projection of a three-dimensional model and a background layer.
Figure 2B:
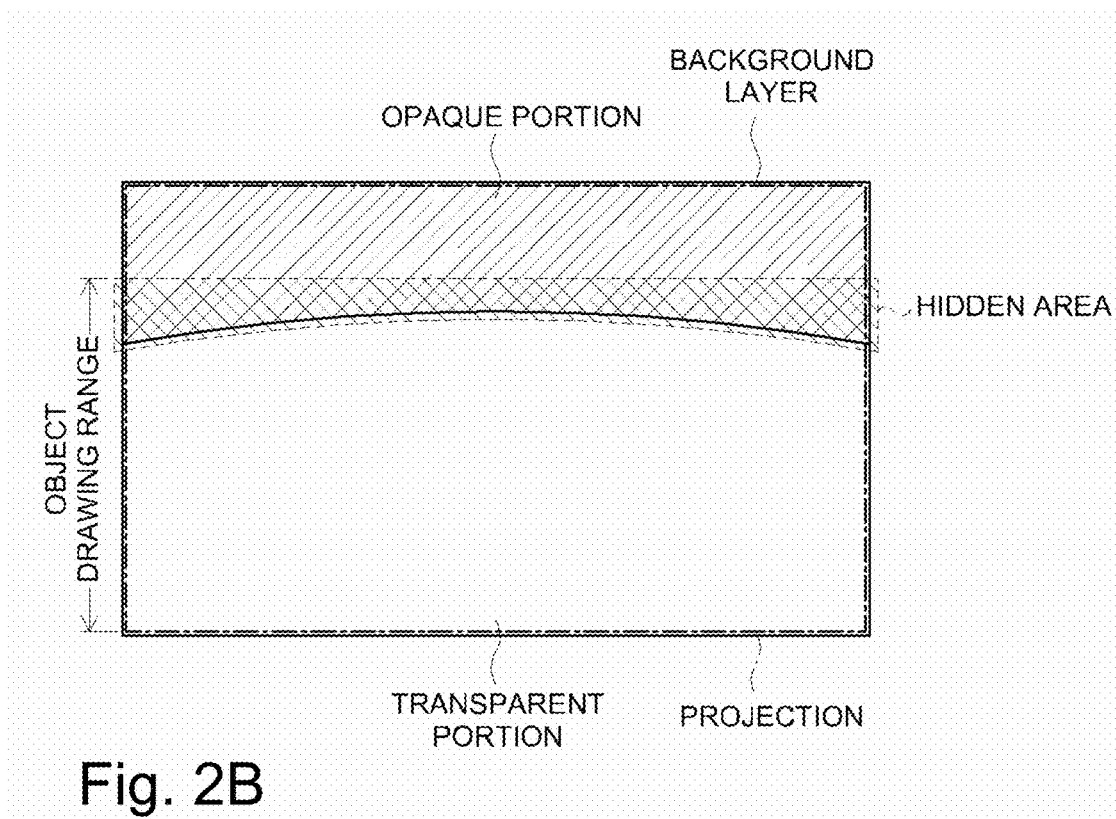
FIG. 2B is diagrams illustrating the relationship between a projection of a three-dimensional model and a background layer.

FIGS. 2A and 2B are diagrams illustrating the relationship between a projection of a three-dimensional model and a background layer. FIG. 2A schematically illustrates the three-dimensional model and the background layer. As illustrated in FIG. 2A, the projection is drawn by perspective projection of the three-dimensional model. The drawing range of the projection is called object drawing range. This range is varied by the gaze direction during projection.

The background layer is provided as a layer showing a background image to be visually recognized as the background in the three-dimensional map. According to the embodiment, the background layer is superimposed not on the rear surface of the projection but on the front surface of the projection as shown in FIG. 2A. An upper hatched part of the background layer is an opaque portion in which the image is not transmitted, and a lower non-hatched part of the background layer is a transparent portion in which the image is transmitted. In other words, when the background layer is superimposed on the front surface of the projection, the projection behind is displayed in the transparent portion, while the projection is hidden in the opaque portion. A transparent gradation area in which the transmittance of the image is gradually varied may be provided on the boundary between the transparent portion and the opaque section in the background layer.

FIG. 2B illustrates the state that the background layer is superimposed on the front surface of the projection. As described above, while the projection is visible through the transparent portion of the background layer, the projection is invisible in the opaque portion and the image of the background layer is visible in the opaque portion. When the transparent gradation area is provided, there is an area in which the projection is blurred, on the boundary between the transparent portion and the opaque portion.

According to the embodiment, as shown by a cross hatched area in the illustration, the projection and the background layer are drawn, such that part of the object drawing range is covered and hidden by the opaque portion of the background layer. Covering part of the projection with the background image enables a variety of pseudo-images to be output.

Figure 3A:
FIG. 3A is diagrams illustrating the outline of a generation method of a three-dimensional map MAP according to the embodiment.
Figure 3B:
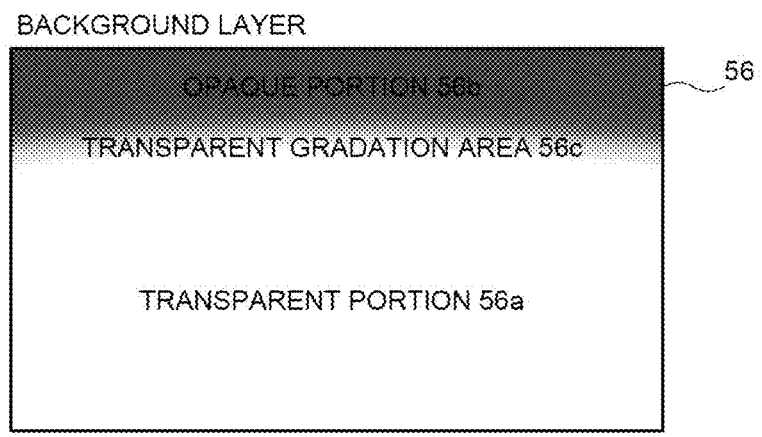
FIG. 3B is diagrams illustrating the outline of a generation method of a three-dimensional map MAP according to the embodiment.
Figure 3C:
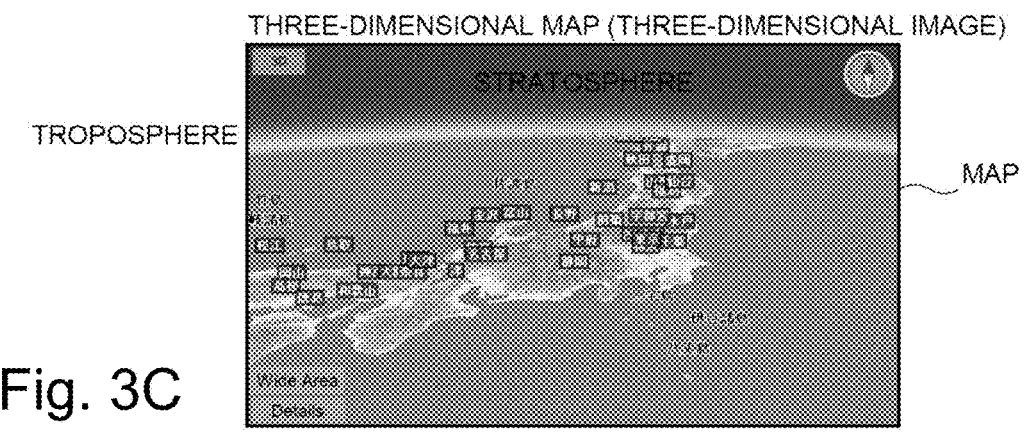
FIG. 3C is diagrams illustrating the outline of a generation method of a three-dimensional map MAP according to the embodiment.

FIGS. 3A through 3C are diagrams illustrating the outline of a generation method of a three-dimensional map MAP according to the embodiment. FIG. 3A illustrates one example of a projection 52. As shown in FIG. 3A, the projection 52 is generated by perspective projection using the three-dimensional model 12 read from the map database 10. In this illustrated example, the projection 52 is drawn in a display scale that displays the entire country of Japan. Features are drawn in the lower object drawing range of the projection 52, and characters are drawn on the projection 52. The horizon should be fundamentally visible as a curved line in this display scale. The three-dimensional model is, however, provided in the orthogonal coordinate system, so that the upper edge of the object drawing range is drawn as a straight line in the projection 52.

FIG. 3B illustrates one example of a background layer 56. The background layer 56 is generated by two-dimensionally drawing the background image data 16 read from the map database 10. This background layer 56 includes a transparent portion 56*a* and an opaque portion 56*b*, and a transparent gradation area 56*c* in which the transmittance of the image is gradually varied is provided on the boundary. An image forming the background of the projection shown in FIG. 3A is drawn in the opaque portion 56*b*. In this illustrated example, an image representing the stratosphere is drawn in the opaque portion 56*b*. The boundary of the stratosphere is expected to be visible as a curved line following the horizon, so that the boundary of the opaque portion 56*b* is drawn by a curved line in the background layer 56. Since the background layer 56 is generated by simply drawing the image two-dimensionally, it is easy to drawn the boundary by the curved line. In the background layer 56 of the embodiment, the troposphere between the ground surface and the stratosphere is expressed by the transparent gradation area 56*c*. More specifically, in this transparent gradation area 56*c*, the transmittance is varied gradually from the transparent state to the opaque state from the transparent portion 56*a* toward the opaque portion 56*b*, and the color is changed from white to dark blue expressing the stratosphere.

FIG. 3C illustrates one example of a three-dimensional map (bird's eye view) as a three-dimensional image. In this displayed image, the background layer 56 is superimposed on the front surface of the projection 52. A three-dimensional map MAP on a global scale is output by covering and hiding a straight line section on the upper edge of the projection 52 with the opaque portion 56*c* of the background layer. The boundary of the background layer 56 is drawn by a curved line, so that a pseudo-image in which the horizon is visible as a curved line is generated in FIG. 3C, while the horizon is drawn by a straight line in FIG. 3A. In output of this three-dimensional map MAP including the stratosphere as the background, this achieves pseudo-expression of the horizon by a pseudo-curved line without describing the three-dimensional model, i.e., the ground surface and the features, by a sphere model or an earth ellipsoid model and without performing any complicated operations. In the transparent gradation area 56*c*, the boundary between the opaque portion 56*b* and the three-dimensional object image 52 transmitted through the transparent portion 56*a* is blurred to express the troposphere between the ground surface and the stratosphere.

A2. Background Image Data Generation Process

Figure 4:
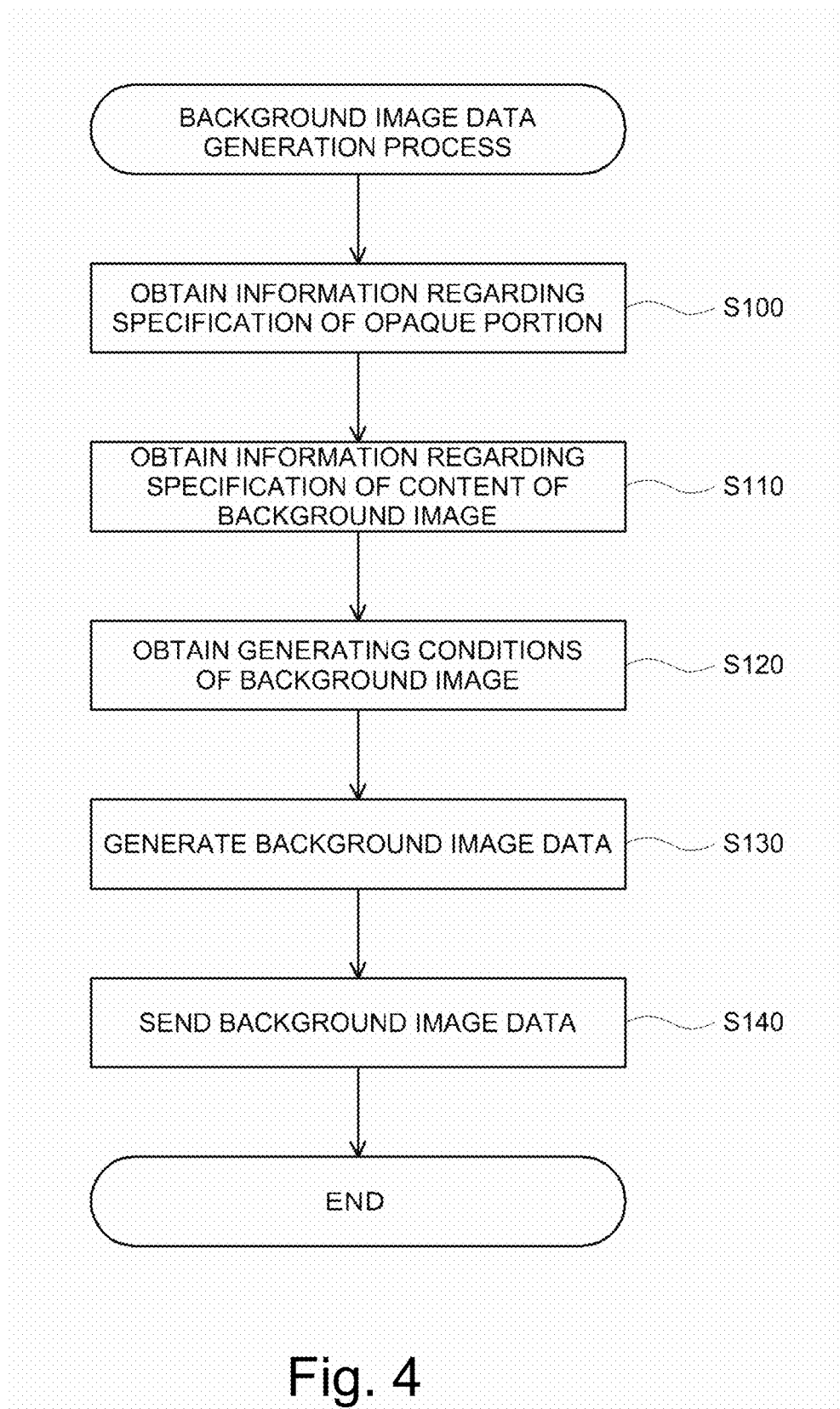
FIG. 4 is a flowchart showing a flow of background image data generation process according to the first embodiment.

FIG. 4 is a flowchart showing a flow of background image data generation process according to the first embodiment.

This process is performed by the CPU of the background image data generation device 200 in response to the operator's instruction to generate the background image data 16 which is stored in the map database 10 of the three-dimensional map display device 100.

When the process flow start, the CPU obtains information regarding specification of the opaque portion 56*b* of the background layer 56 input by the operator (step S100). For example, the CPU obtains information regarding how many percents of an upper area in the background layer 56 is to be specified as the opaque portion 56*b*. On the contrary, the CPU may obtain information regarding specification of the transparent portion 56*a* in the background layer 56. Moreover, the opaque portion is not necessarily a rectangular area. Any of various shapes may be specified as the opaque portion at step S100.

The CPU subsequently obtains information regarding specification of the content of the background image input by the operator (step S110). For example, in the case of generation of the background image data for the background layer 56 described above with reference to FIG. 3B, the image of the stratosphere of the earth is specified. The content of the background image may be specified, for example, by selecting one of image data for backgrounds stored in advance in the background image data generation device 200.

The CPU subsequently obtains generating conditions of a background image input by the operator (step S120). The generating conditions of the background image may be, for example, the curvature of a circular arc or an elliptical arc on the boundary between the opaque portion 56*b* and the transparent portion 56*a* in the background layer 56 and the width of the transparent gradation area 56*c*. The CPU generates background image data 16 based on the obtained information and generating conditions of the background image (step S130) and sends the background image data 16 to the three-dimensional map display device 100 (step S140). More specifically, the CPU reads image data of a background corresponding to the content specified at step S110. This image data is data of an entire opaque portion without any transparent portion. The CPU specifies part of the image data as the transparent portion, based on the generating conditions of the background image. The CPU also provides a transparent gradation area of the specified width. One modification may enable the operator to specify part of the image data as the opaque portion.

This series of processing completes the background image data generation process of the first embodiment.

A3. Background Image

The background image of the embodiment is used to generate a pseudo-image, which is not drawn by simple perspective projection, by covering and hiding part of the projection as described in FIGS. 2A, 2B, and 3A through 3C. In the illustrated example of FIGS. 3A through 3C, the background image representing the stratosphere is used, so that the upper part of the projection is covered and hidden. The part of the projection covered and hidden by the background image is, however, not limited to the upper part of the projection.

Figure 5:
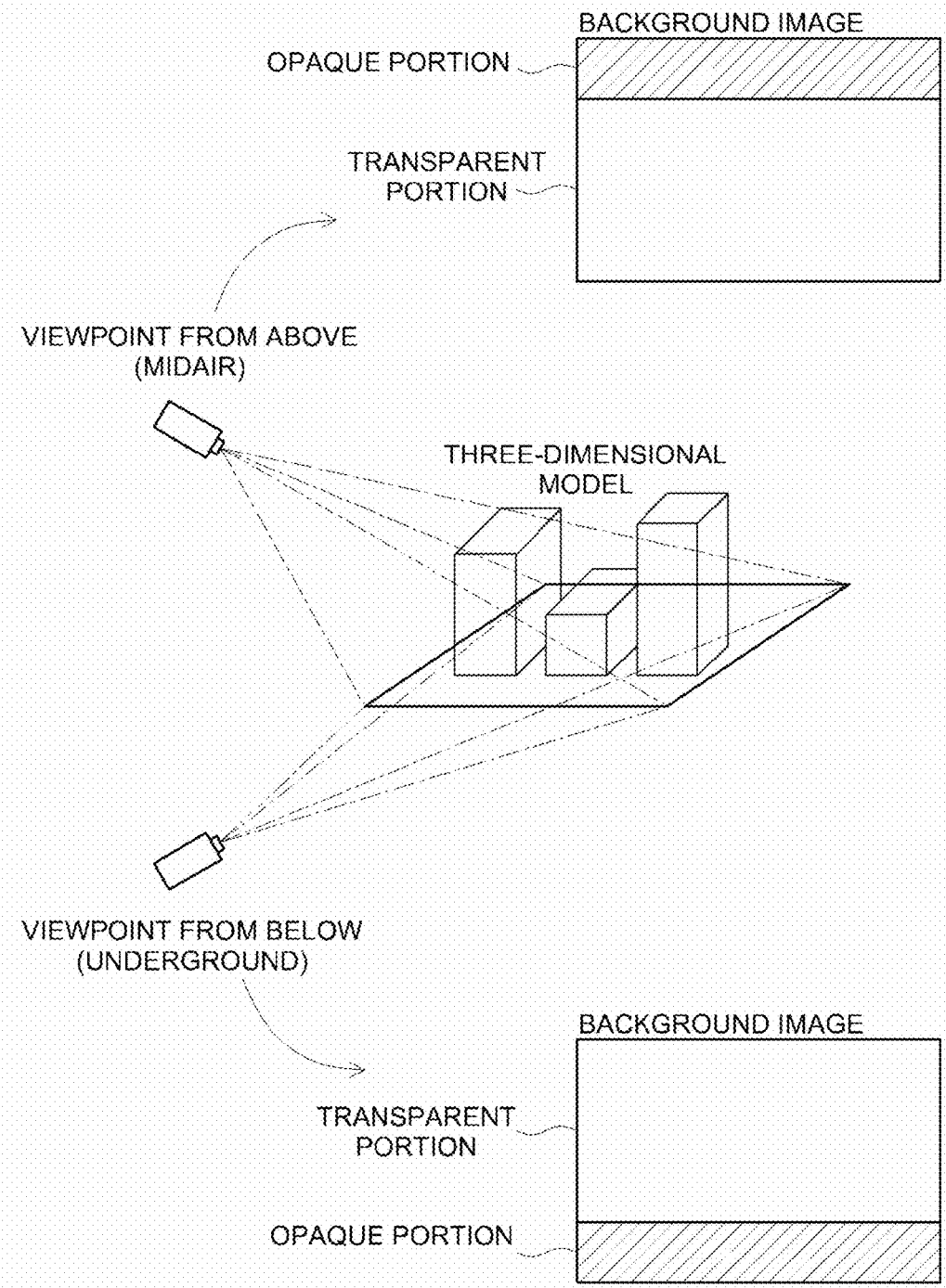
FIG. 5 is a diagram illustrating the relationship between the gaze direction and the background image.

FIG. 5 is a diagram illustrating the relationship between the gaze direction and the background image. As illustrated, when the gaze direction specified looks down from above (midair) of the three-dimensional model, a projection is drawn in a lower part as illustrated in the upper drawing. It is accordingly preferable to specify the upper part of the background image as an opaque portion and the lower part of the background image as a transparent portion and partially hide an upper part of the projection. When the gaze direction specified looks up from below (underground) of the three-dimensional model, on the other hand, a projection is drawn in an upper part as illustrated in the lower drawing. It is accordingly preferable to specify the upper part of the background image as a transparent portion and the lower part of the background image as an opaque portion and partially hide a lower part of the projection. As described above, various settings are allowed for the opaque portion and the transparent portion of the background image.

The opaque portion is not unequivocally determined by the gaze direction. For example, an opaque portion may be provided in the lower part with respect to the gaze direction looking down from above in FIG. 5. On the contrary, an opaque portion may be provided in the upper part with respect to the gaze direction looking up from below in FIG. 5. This is because the projection may not be necessarily drawn densely, for example, when polygons representing the ground surface are not provided as map data or when the three-dimensional model of buildings is generated more sparsely than the actual state.

A4. Three-Dimensional Map Display Process

Figure 6:
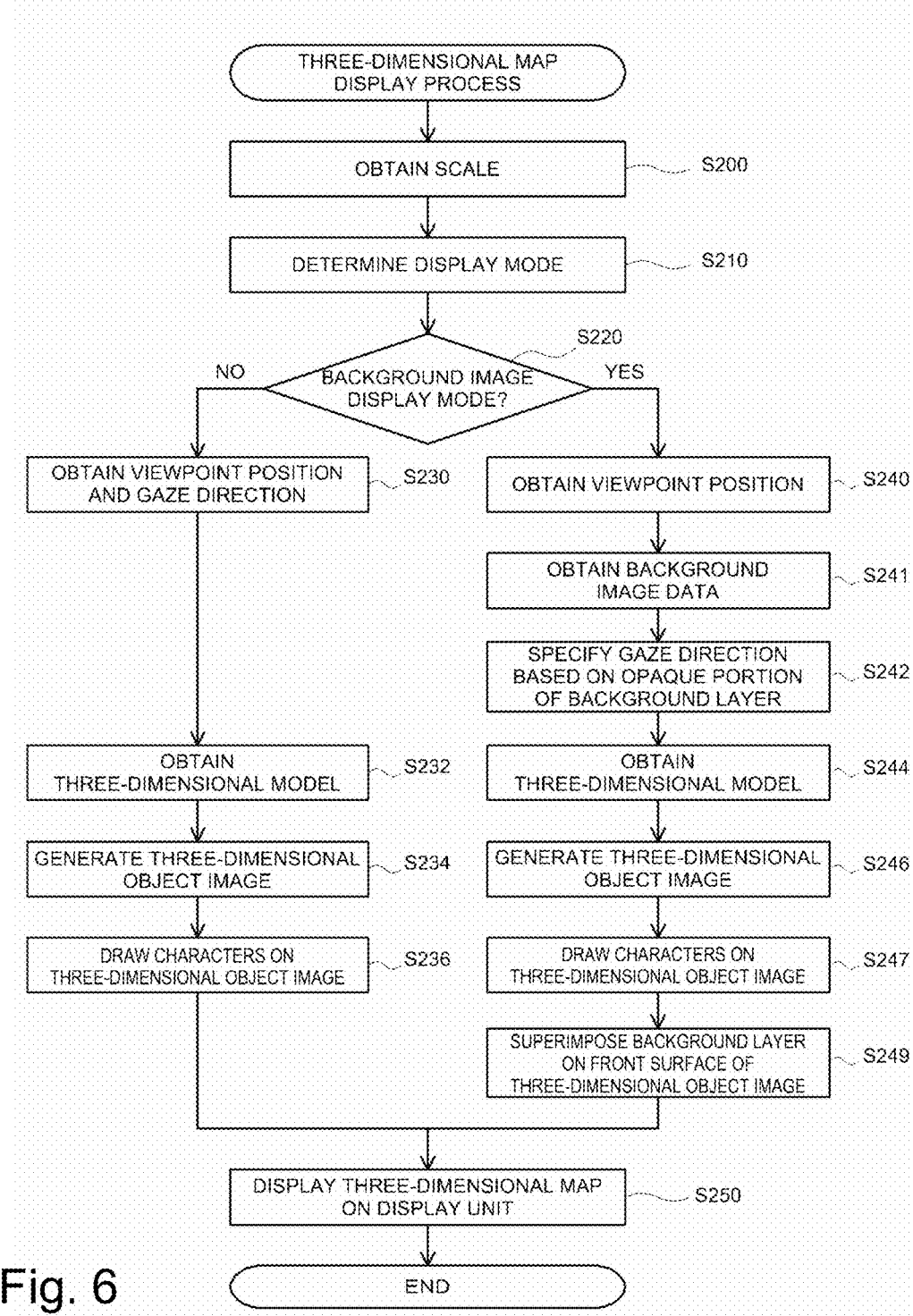
FIG. 6 is a flowchart showing a flow of three-dimensional map display process according to the first embodiment.

FIG. 6 is a flowchart showing a flow of three-dimensional map display process according to the first embodiment. This process is performed by the CPU of the three-dimensional map display device 100, in response to input of a display instruction of a three-dimensional map.

When a display instruction of a three-dimensional map is input, the CPU obtains the scale of a three-dimensional map specified by the user (step S200). The CPU subsequently determines the display mode of the three-dimensional map, based on the obtained scale (step S210). According to the embodiment, a background image non-display mode and a background image display mode are provided as the display modes of the three-dimensional map. In the background image non-display mode, the three-dimensional map MAP is displayed without using the background image data 16 stored in the map database 10. Accordingly, the background image non-display mode of the embodiment includes a case of displaying a three-dimensional map MAP, in which the background such as the sea, the mountains, the sky and the clouds is drawn without using the background image data 16. In the background image display mode, on the other hand, the three-dimensional map MAP is displayed using the background image data 16 stored in the map database 10. In the embodiment, the image of the stratosphere of the earth is used as the background image. In the small scale that displays the three-dimensional map MAP in a wide area such as a global scale with the stratosphere, the background image display mode is applied as the display mode. In the large scale that does not display the stratosphere as the background image, the background image non-display mode is applied as the display mode.

The CPU subsequently determines whether the display mode determined at step S210 is the background image display mode (step S220). When the display mode is the background image non-display mode (step S220: NO), the CPU obtains the viewpoint position and the gaze direction (step S230) and obtains the three-dimensional model 12 of features as the processing object from the map database 10, based on the scale of the three-dimensional map, the viewpoint position and the gaze direction (step S232). The CPU then performs rendering by perspective projection based on the viewpoint position and the gaze direction to generate a three-dimensional object image 52, in which features are drawn three-dimensionally (step S234). The background such as the sky and the clouds is drawn appropriately by a prior art technique in the three-dimensional object image 52. The CPU obtains the character data 14 from the map database 10 with respect to features displayed in the three-dimensional object image 52, i.e., features visible from the viewpoint position and appropriately draws characters on the three-dimensional object image 52 according to the contents of the character data 14 (step S236). The CPU then displays a resulting three-dimensional map MAP in the background image non-display mode on the display unit 60 (step S250). After that, the CPU may output the three-dimensional map MAP to the printer 300, in response to the user's output instruction.

When the display mode is the background image display mode (step S220: YES), on the other hand, the CPU obtains the viewpoint position (step S240). The CPU subsequently obtains the background image data 16 from the map database 10 (step S241) and generates a background layer 56 using the background image data 16. The CPU then specifies the gaze direction to hide an upper edge of an object drawing range by an opaque portion 56*b* of the background layer 56 (step S242). According to the embodiment, the background image data 16 is provided in advance, so that the opaque portion 56*b* of the background layer 56 is specified in advance. The size of the object drawing range depends on the gaze direction. The inadequate gaze direction may accordingly result in the case that the stratosphere is invisible or that the object drawing range is not hidden by the opaque portion 56*b*. For example, when the gaze direction is the vertical direction, the stratosphere is invisible even in the scale that displays a wide area. When the gaze direction is substantially equal to the horizontal direction, the object drawing range is a narrow area in the lower part of the image and may not be covered or hidden by the opaque portion 56*b*. As described above, determining the opaque portion 56*b* of the background layer 56 results in determining the allowable range of the gaze direction to cause part of the object drawing range to be covered and hidden. At step S242, the CPU sets the gaze direction in this allowable range. According to a modification, when the gaze direction input by the user is out of the allowable range, the CPU may modify the gaze direction to be included in the allowable range.

The opaque portion 56*b* of the background layer 56 is specified in advance according to the embodiment but may be specified by analyzing the background image data 16.

The CPU subsequently obtains the three-dimensional model 12 of features as the processing object from the map database 10, based on the viewpoint position and the gaze direction (step S244). The CPU then performs rendering by perspective projection based on the viewpoint position and the gaze direction to generate a three-dimensional object image 52, in which features are drawn three-dimensionally (step S246). The CPU subsequently obtains the character data 14 from the map database 10 with respect to features displayed in the three-dimensional object image 52, i.e., features visible from the viewpoint position and appropriately draws characters on the three-dimensional object image 52 according to the contents of the character data 14 (step S247). In the background image display mode, the scale of the three-dimensional map MAP is sufficiently small, so that characters with respect to small features such as buildings and roads are not drawn but only characters representing main geographical names are drawn. The CPU then superimposed the background layer 56 on the front surface of the three-dimensional object image 52 with the characters drawn thereon (step S249) and displays a resulting three-dimensional map MAP in the background image display mode on the display unit 60 (step S250). After that, the CPU may output the three-dimensional map MAP to the printer 300, in response to the user's output instruction.

The three-dimensional map display system of the first embodiment described above superimposes the background layer 56 on the front surface of the three-dimensional object image 52, so as to cause part of the three-dimensional object image 52 to be transmitted through the transparent portion 56*a* of the background layer 56, to cover and hide part of the three-dimensional object image 52 by the opaque portion 56*b* of the background layer 56 and to express the boundary between the three-dimensional object image 52 and the stratosphere by a curved line. This enables an image that is fundamentally implemented using complicated coordinate conversion or a special three-dimensional model to be expressed by a pseudo-image. This enables a variety of backgrounds to be output with the improved reality, while suppressing increases in data volume and processing load in the process of outputting a three-dimensional map MAP, in which features are drawn three-dimensionally, along with a background image.

B. Second Embodiment

In the three-dimensional map display system of the first embodiment, the background image data 16 are stored in advance in the map database 10. In a three-dimensional map display system of a second embodiment, on the other hand, background image data 16 are generated appropriately by a background image data generation device 200A during the three-dimensional map display process. In the three-dimensional map display system of the second embodiment, there is no need to store the background image data 16 in the map database 10 of the three-dimensional map display device 100.

Figure 7:
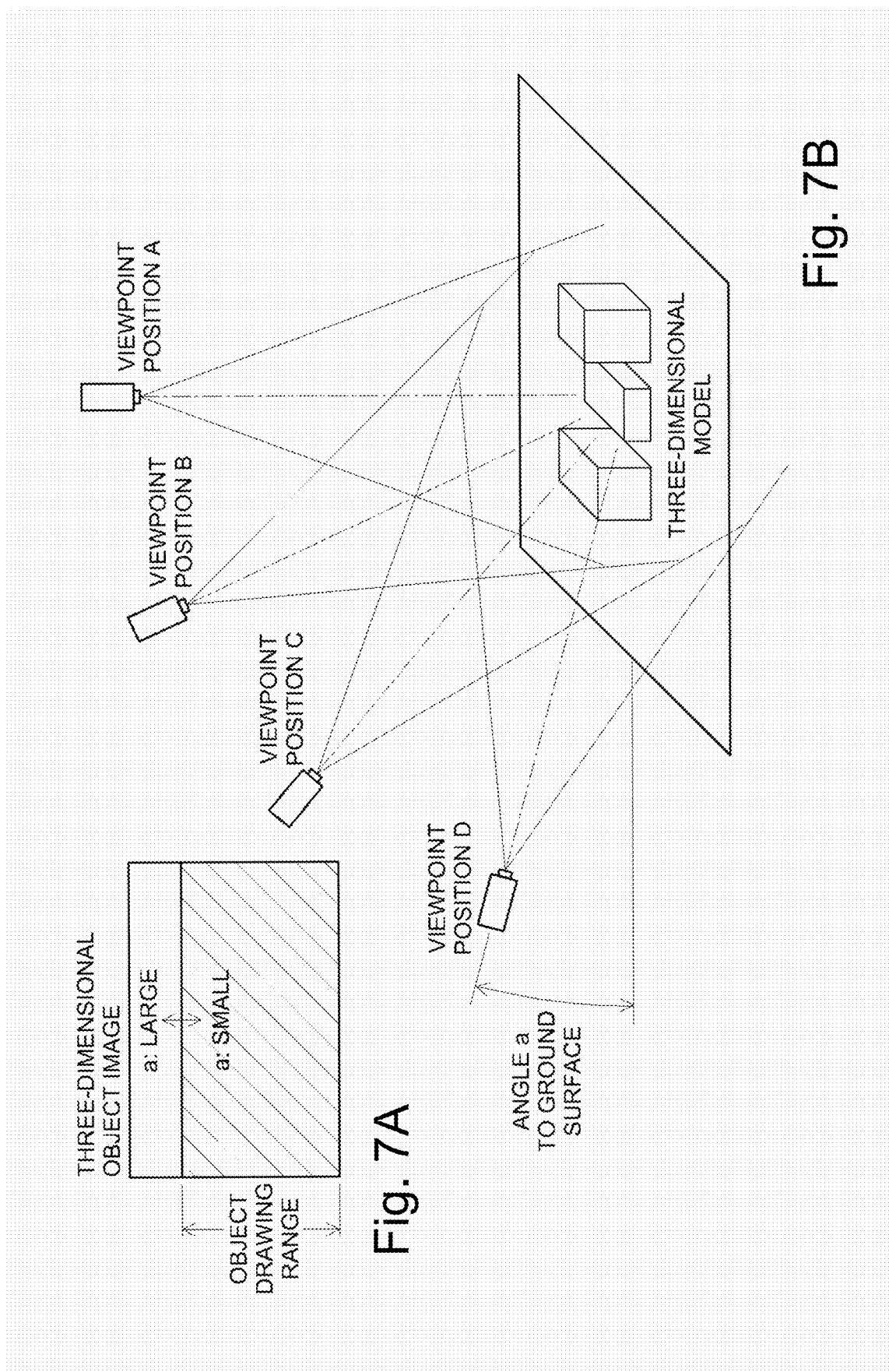
FIGS. 7A and 7B are diagrams schematically illustrating the relationship between the three-dimensional model, the viewpoint position and the object drawing range of a three-dimensional object image.

FIGS. 7A and 7B are diagrams schematically illustrating the relationship between the three-dimensional model, the viewpoint position and the object drawing range of a three-dimensional object image. As illustrated in FIG. 7A, the object drawing range of the three-dimensional object image increases with an increase in angle "a" between the gaze direction from the viewpoint position to the three-dimensional model and the ground surface (in the order from the viewpoint position D to the viewpoint position A), as shown in FIG. 7B. In other words, the boundary between the object drawing range and the background moves upward in the three-dimensional object image. The object drawing range of the three-dimensional object image decreases, on the contrary, with a decrease in angle "a" between the gaze direction from the viewpoint position to the three-dimensional model and the ground surface (in the order from the viewpoint position A to the viewpoint position D). In other words, the boundary between the object drawing range and the background moves downward in the three-dimensional object image. With such a change in object drawing range, there is a need to change the background image data 16 used to cover and hide part of the object drawing range. The second embodiment accordingly generates background image data 16 according to the change of the object drawing range in the three-dimensional object image.

B1. Background Image Data Generation Device

Figure 8:
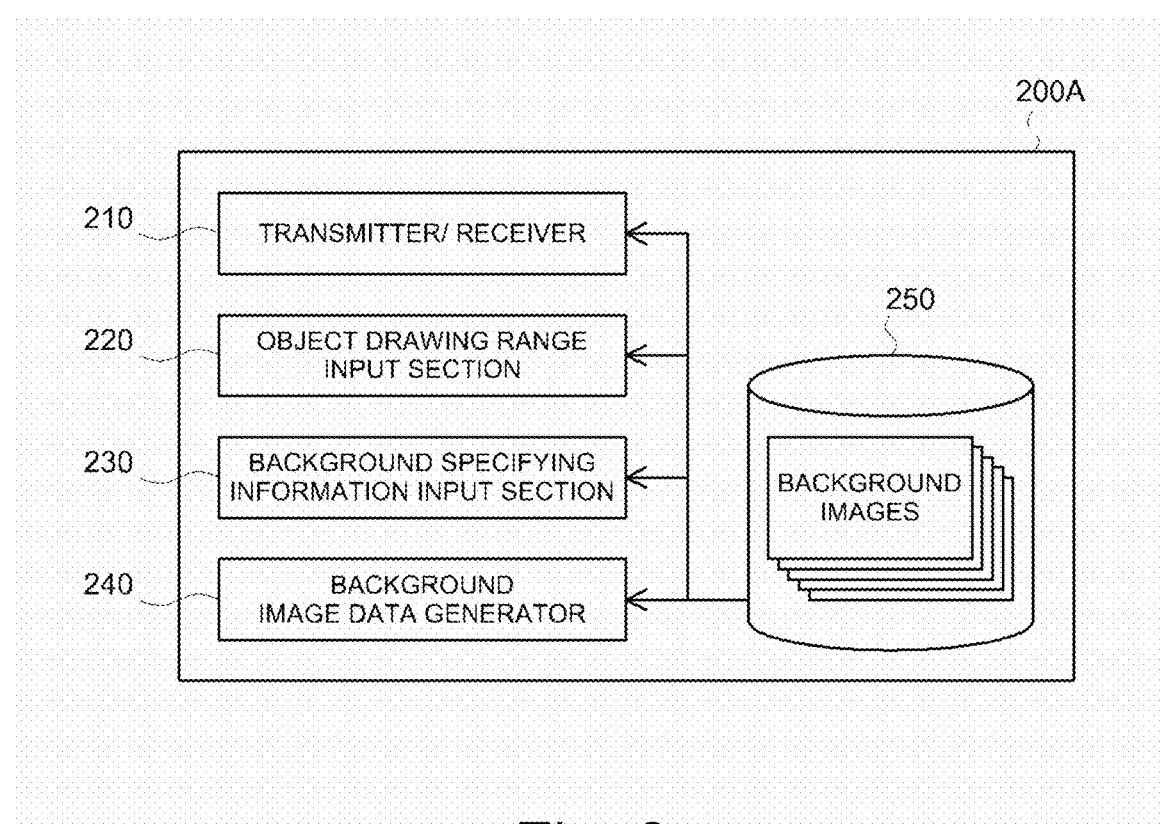
FIG. 8 is a diagram illustrating the general configuration of a background image data generation device 200A according to a second embodiment.

FIG. 8 is a diagram illustrating the general configuration of the background image data generation device 200A according to the second embodiment. As illustrated, the background image data generation device 200A includes a transmitter/receiver 210, an object drawing range input section 220, a background specifying information input section 230, a background image data generator 240 and a background image storage 250. These respective functional blocks are configured as software configuration by installing computer programs for implementing the respective functions in an information processing device including, for example, a CPU, a RAM, a ROM, a hard disk drive and a communication device. At least part of these functional blocks may alternatively be configured as hardware configuration.

The background image storage 250 stores the materials of a plurality of different background images. The materials of the background images include, for example, an image of the stratosphere of the earth and images of the sea, the mountains, the sky and the clouds. Neither transparent portion nor opaque portion is yet formed in these materials.

The transmitter/receiver 210 receives various information used for generation of background image data 16 from the three-dimensional map display device 100 and sends the background image data 16 generated by the background image data generation device 200A to the three-dimensional map display device 100. The information received from the three-dimensional map display device 100 includes, for example, information specifying an object drawing range in which an object is drawn in a three-dimensional object image 52 and background specifying information specifying the content of a background of the three-dimensional object image 52 in a three-dimensional map MAP.

The object drawing range input section 220 inputs information specifying an object drawing range in which an object is drawn in a three-dimensional object image 52, from the three-dimensional map display device 100 via the transmitter/receiver 210. The background specifying information input section 230 inputs background specifying information specifying the content of a background of the three-dimensional object image 52 in a three-dimensional map MAP. The background image data generator 240 refers to the background image storage 250 based on the information input by the object drawing range input section 220 and the background specifying information input section 230, and generates background image data 16 representing a background image including an opaque portion 56b configured to cover and hide part of the object drawing range in the three-dimensional object image 52 by the specified background and a residual area of the opaque portion 56b specified as a transparent portion 56a.

B2. Three-Dimensional Map Display Process

Figure 9:
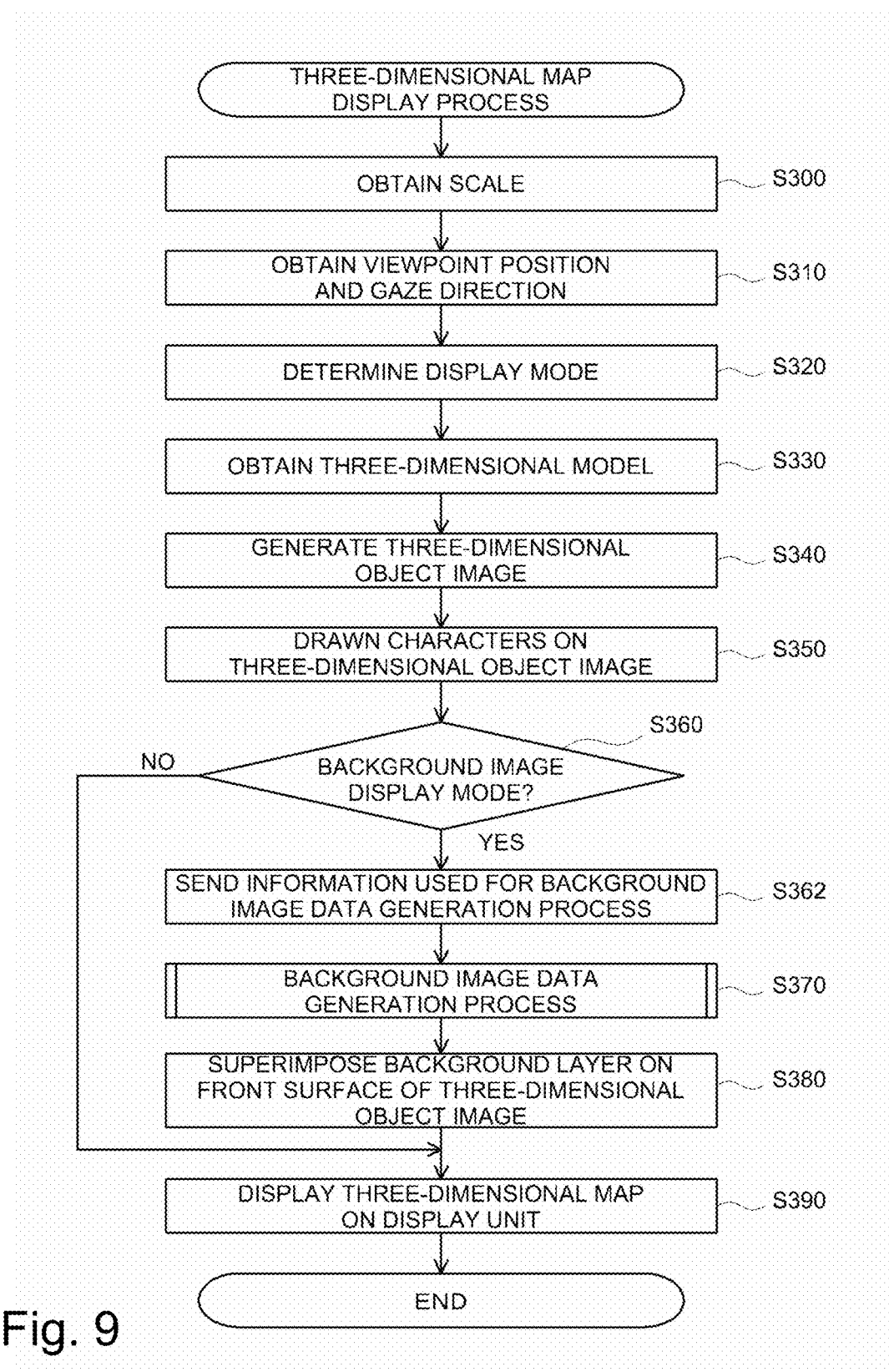
FIG. 9 is a flowchart showing a flow of three-dimensional map display process according to the second embodiment.

FIG. 9 is a flowchart showing a flow of three-dimensional map display process according to the second embodiment. This process is performed by the CPU of the three-dimensional map display device 100 in cooperation with the CPU of the background image data generation device 200A, in response to a display instruction of a three-dimensional map.

When a display instruction of a three-dimensional map is input, the three-dimensional map display device 100 obtains the scale of a three-dimensional map specified by the user (step S300). The three-dimensional map display device 100 also obtains the viewpoint position and the gaze direction (step S310). The three-dimensional map display device 100 subsequently determines the display mode of the three-dimensional map, based on the obtained scale, viewpoint position and gaze direction (step S320).

The three-dimensional map display device 100 then obtains the three-dimensional model 12 of features as the processing object from the map database 10, based on the scale of the three-dimensional map, the viewpoint position and the gaze direction (step S330). The three-dimensional map display device 100 then performs rendering by perspective projection based on the viewpoint position and the gaze direction to generate a three-dimensional object image 52, in which features are drawn three-dimensionally (step S340). The three-dimensional map display device 100 subsequently obtains the character data 14 from the map database 10 with respect to features displayed in the three-dimensional object image 52, i.e., features visible from the viewpoint position and appropriately draws characters on the three-dimensional object image 52 according to the contents of the character data 14 (step S350).

The three-dimensional map display device 100 subsequently determines whether the display mode determined at step S320 is the background image display mode (step S360). When the display mode is the background image non-display mode (step S360: NO), the three-dimensional map display device 100 superimposes the three-dimensional object image 52 with the drawn characters on the front surface of a background image provided in advance by a prior art technique and displays a resulting three-dimensional map MAP on the display unit 60 (step S390). After that, the three-dimensional map display device 100 may output the three-dimensional map MAP to the printer 300, in response to the user's output instruction.

When the display mode is the background image display mode (step S360: YES), on the other hand, the three-dimensional map display device 100 sends various information used for a background image data generation process in the background image data generation device 200A to the background image data generation device 200A (step S362). The background image data generation device 200A utilizes the information received from the three-dimensional map display device 100 and performs the background image data generation process described later to generate background image data 16 (step S370). The three-dimensional map display device 100 uses the background image data 16 generated by the background image data generation process in the background image data generation device 200A to generate a background layer 56 and superimposes the background layer 56 on the front surface of the three-dimensional object image 52 (step S380) and displays a resulting three-dimensional map MAP on the display unit 60 (step S390). Like the three-dimensional map MAP in the background image display mode of the first embodiment, this three-dimensional map MAP has part of the three-dimensional object image 52 covered and hidden by the opaque portion 56b of the background layer 56. After that, the CPU of the three-dimensional map display device 100 may output the three-dimensional map MAP to the printer 300, in response to the user's output instruction.

B3. Background Image Data Generation Process

Figure 10:
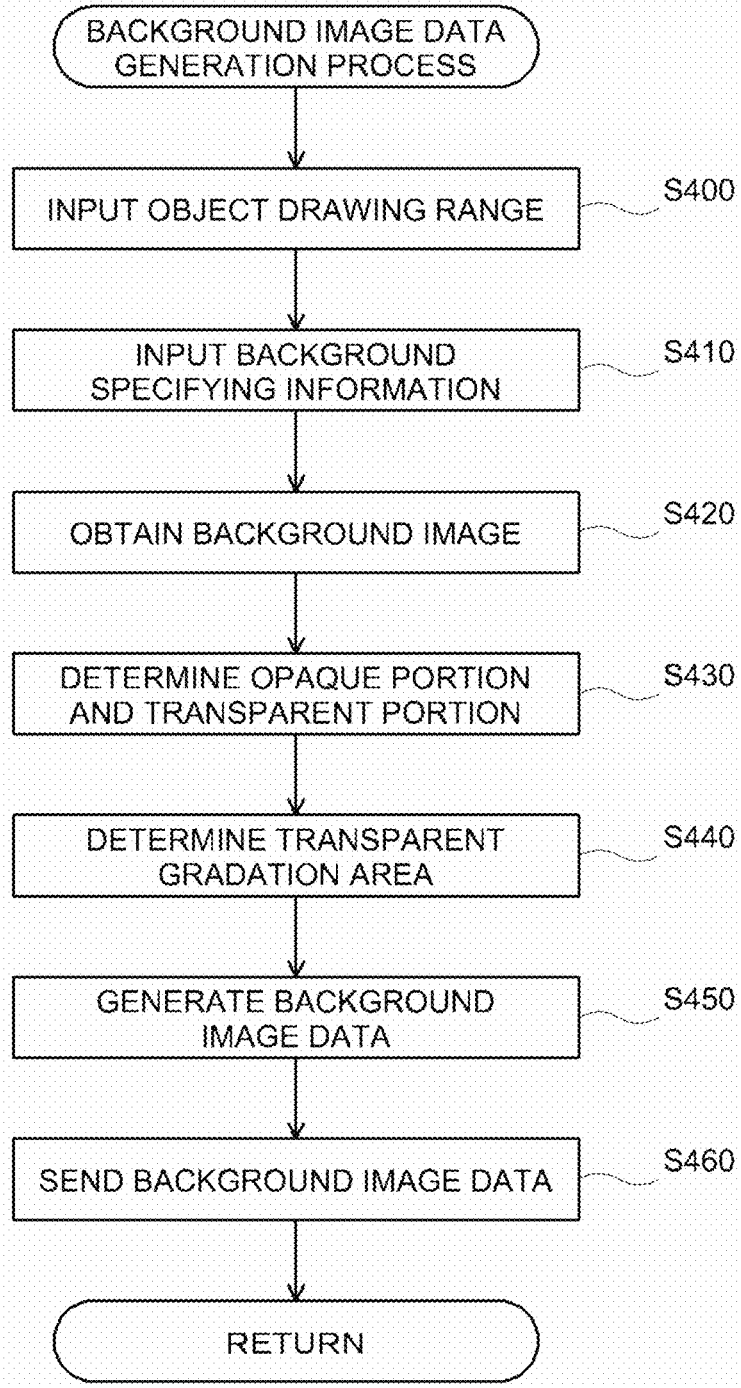
FIG. 10 is a flowchart showing a flow of background image data generation process according to the second embodiment.

FIG. 10 is a flowchart showing a flow of background image data generation process according to the second embodiment. This process corresponds to step S370 in the three-dimensional map display process of FIG. 9 and is performed by the CPU of the background image data generation device 200A.

The background image data generation device 200A receives information specifying an object drawing range in which an object is drawn in a three-dimensional object image 52, from the three-dimensional map display device 100 and inputs the object drawing range (step S400). For example, the input object drawing range shows that lower 80% of the three-dimensional object image 52 is the object drawing range. The background image data generation device 200A also receives background specifying information specifying the content of a background of the three-dimensional object image 52 in a three-dimensional map MAP, from the three-dimensional map display device 100 and inputs the background specifying information (step S410). For example, the input background specifying information specifies that the background is the stratosphere of the earth or specifies the curvature of a circular arc or an elliptical arc on the boundary between a transparent portion 56*a* and an opaque portion 56*b* or the width of a transparent gradation area 56*c*. The background image data generation device 200A then obtains the material of a background image specified by the input background specifying information, from the background image storage 250 (step S420).

The background image data generation device 200A subsequently determines an opaque portion and a transparent portion of the background image, based on the information (object drawing range and background specifying information) input at steps S400 and S410 (step S430). The opaque portion and the transparent portion of the background image are determined, such that part of the object drawing range including the entire uppermost edge is covered and hidden with the opaque portion of the background image. For example, in the background layer shown in FIG. 3B, the background image data generation device 200A draws the boundary at the specified curvature and adjusts the vertical position of the curved line to locate the apex of the curvature below the uppermost edge of the object drawing range. The background image data generation device 200A also adequately determines a transparent gradation area, based on the background specifying information (step S440). The background image data generation device 200A generates background image data 16, based on the material of the background image obtained at step S420, the opaque portion and the transparent portion of the background image determined at step S430 and the transparent gradation area determined at step S440 (step S450). More specifically, the background image data generation device 200A reads the image data of the material of the background image, cuts out part of the image data corresponding to the transparent portion and specifies the part as part to be transmitted through. The background image data generation device 200A also sets an alpha value to gradually change the transmittance in part of the image data corresponding to the transparent gradation area. The CPU of the background image data generation device 200A then sends the generated background image data 16 to the three-dimensional map display device 100 (step S460).

Like the three-dimensional map display system of the first embodiment, the three-dimensional map display system of the second embodiment described above superimposes the background layer 56 on the front surface of the three-dimensional object image 52, so as to cause part of the three-dimensional object image 52 to be transmitted through the transparent portion 56*a* of the background layer 56 and to cover and hide part of the three-dimensional object image 52 by the opaque portion 56*b* of the background layer 56. This enables an image that is fundamentally implemented using complicated coordinate conversion or a special three-dimensional model to be expressed by a pseudo-image. This enables a variety of backgrounds to be output with the improved reality, while suppressing increases in data volume and processing load in the process of outputting a three-dimensional map MAP, in which features are drawn three-dimensionally, along with a background image.

Additionally, in the three-dimensional map display system of the second embodiment, the background image data generation device 200A appropriately and flexibly generates a background image according to the object drawing range and the background specifying information of a three-dimensional object image.

C. Modifications

The foregoing describes some aspects of the invention. The present invention is, however, not limited to these aspects but may be implemented by various other aspects within the scope of the invention. Some examples of possible modifications are given below.

C1. Modification 1:

In the above embodiment, the image of the stratosphere of the earth is used as the background image (background layer) of the three-dimensional object image 52 in the three-dimensional map MAP. The invention is, however, not limited to this embodiment. The images of, for example, the sea, the mountains, the sky and the clouds may be used as the background image. In such applications, the boundary between the opaque portion 56*b* and the transparent portion 56*a* of the background layer 56 may be expressed by a straight line, instead of the circular arc or the elliptical arc. The transparent gradation area 56*c* may be omitted on the boundary between the opaque portion 56*b* and the transparent portion 56*a*.

Figure 11:
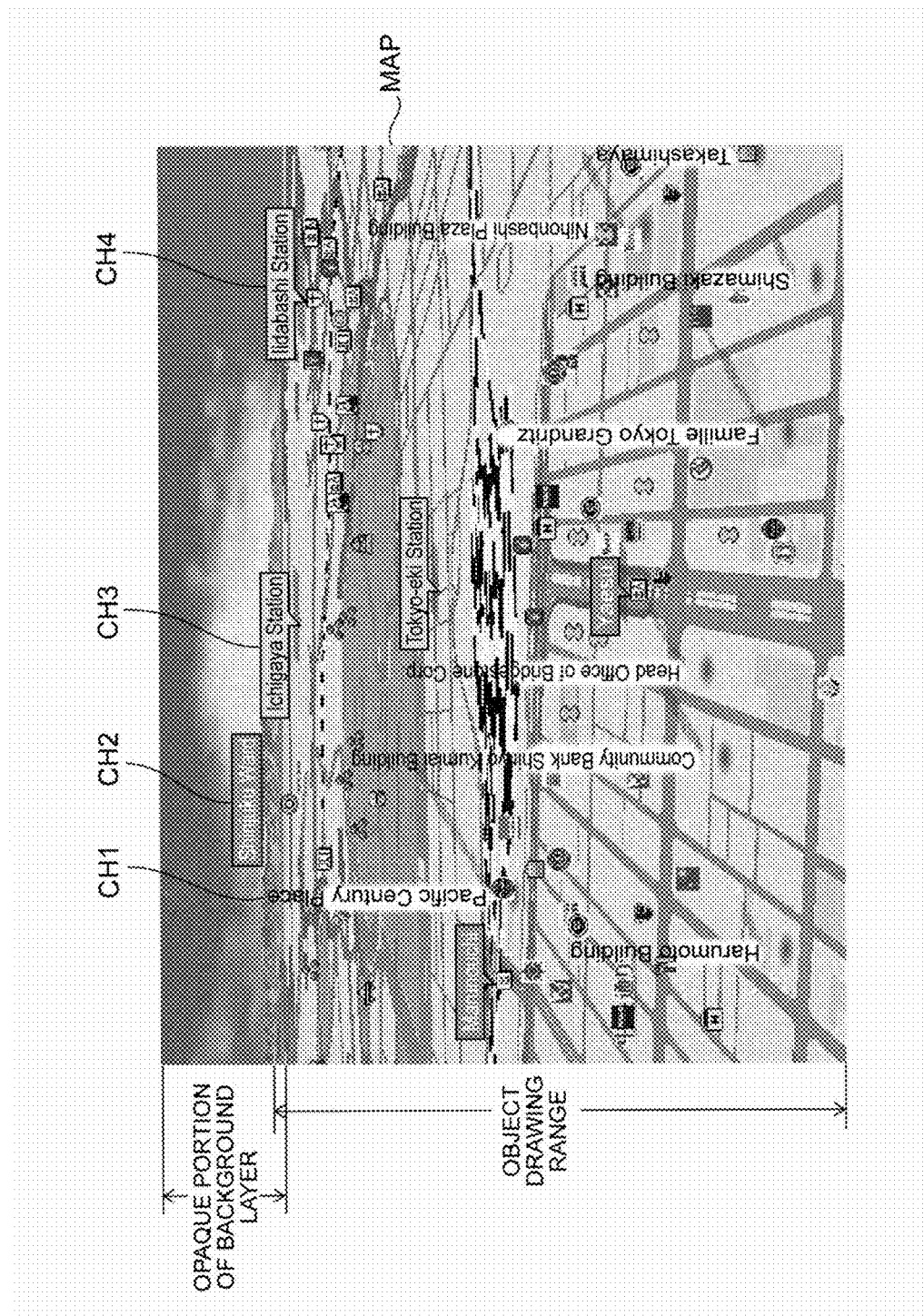
FIG. 11 is a diagram illustrating an output example of a three-dimensional map MAP according to a modification.

FIG. 11 is a diagram illustrating an output example of a three-dimensional map MAP according to a modification. In this three-dimensional map MAP, the mountains, the sky and the clouds are drawn in an opaque portion of a background layer. The boundary between the opaque portion and a transparent portion of the background layer is expressed by a straight line. A transparent gradation area is provided on the boundary between the opaque portion and the transparent portion of the background layer.

The prior art method draws a background image behind a projection. This prior art method, however, makes the boundary between the background image and the projection clearly visible and provides a feeling of strangeness. The method of the modification, on the other hand, places the background layer on the front surface of the projection and provides the transparent gradation area, so as to achieve pseudo-expression of the state that the landscape is gradually blurred at a great distance.

According to this modification, character strings CH1, CH2, CH3 and CH4 are drawn on the front surface of the opaque portion of the background layer. The modification accordingly employs a flow of three-dimensional map display process, which is partly different from the flow of three-dimensional map display process of the second embodiment shown in FIG. 9. More specifically, the three-dimensional map display process of the modification draws characters on a three-dimensional object image 52 after superimposition of a background layer 56 on the front surface thereof. The following briefly describes the flow of three-dimensional map display process according to the modification.

Figure 12:
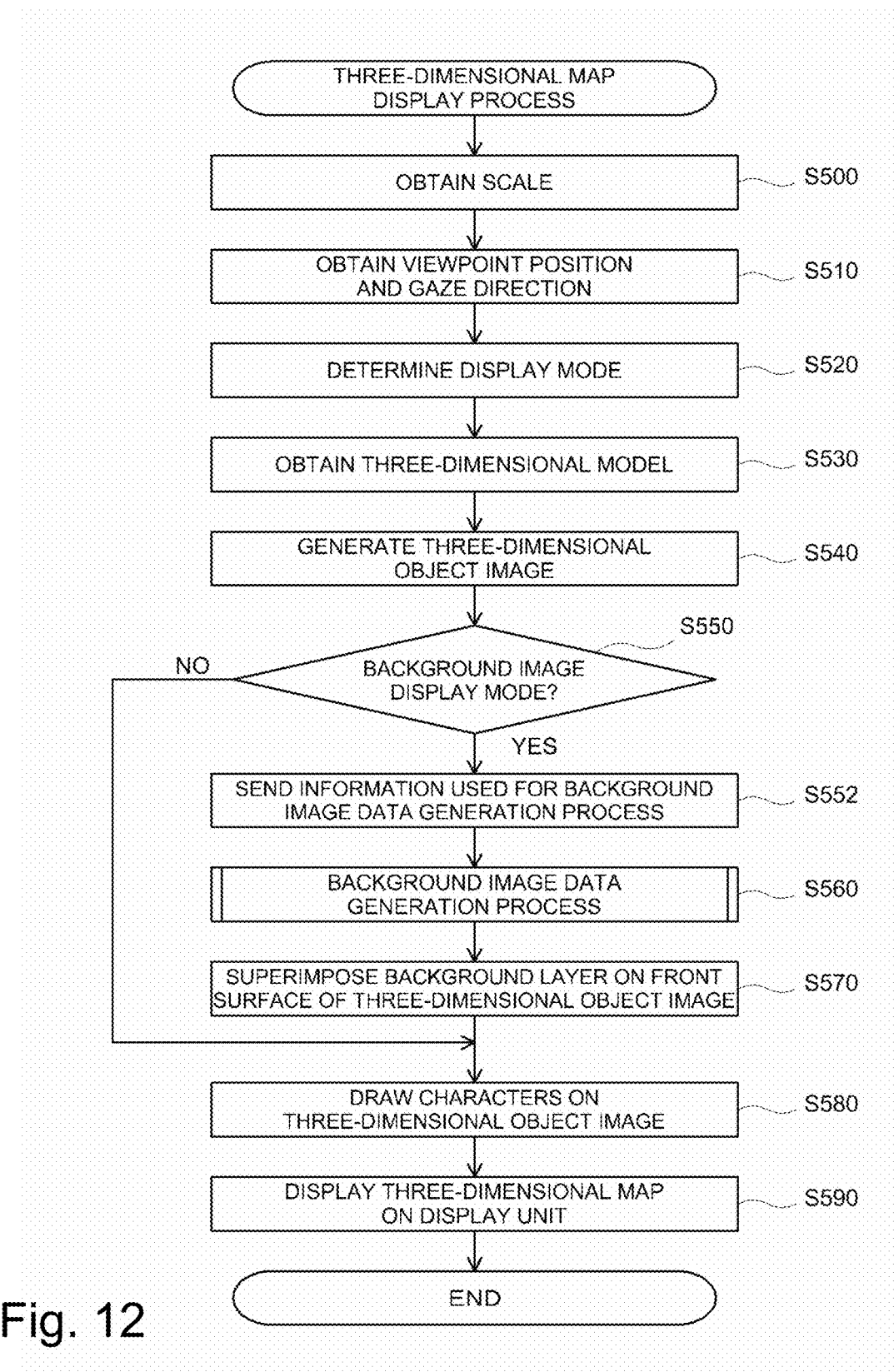
FIG. 12 is a flowchart showing a flow of three-dimensional map display process according to the modification.

FIG. 12 is a flowchart showing the flow of three-dimensional map display process according to the modification. When a display instruction of a three-dimensional map is input, the CPU of the three-dimensional map display device 100 obtains the scale of a three-dimensional map specified by the user (step S500), obtains the viewpoint position and the gaze direction (step S510), and determines the display mode of the three-dimensional map, based on the obtained scale, viewpoint position and gaze direction (step S520). The CPU of the three-dimensional map display device 100 subsequently obtains the three-dimensional model 12 of features as the processing object from the map database 10, based on the scale of the three-dimensional map, the viewpoint position and the gaze direction (step S530), and performs rendering by perspective projection based on the viewpoint position and the gaze direction to generate a three-dimensional object image 52, in which features are drawn three-dimensionally (step S540). This series of processing is identical with the processing of steps S300 to S340 in the three-dimensional map display process of the second embodiment shown in FIG. 9.

The CPU of the three-dimensional map display device 100 subsequently determines whether the display mode determined at step S520 is the background image display mode (step S550). When the display mode is the background image non-display mode (step S550: NO), the CPU of the three-dimensional map display device 100 superimposes the three-dimensional object image 52 on the front surface of a background image provided in advance by a prior art technique, obtains the character data from the map database 10 with respect to features displayed in the three-dimensional object image 52 and adequately draws characters on the three-dimensional object image 52 according to the contents of the character data 14 (step S580), and displays a resulting three-dimensional map MAP on the display unit 60 (step S590).

When the display mode is the background image display mode (step S550: YES), on the other hand, the CPU of the three-dimensional map display device 100 sends various information used for a background image data generation process in the background image data generation device 200A to the background image data generation device 200A (step S552). The background image data generation device 200A utilizes the information received from the three-dimensional map display device 100 and performs the background image data generation process to generate background image data 16 (step S560). The background image data generation process is identical with that of the second embodiment. The CPU of the three-dimensional map display device 100 uses the background image data 16 generated by the background image data generation process in the background image data generation device 200A to generate a background layer 56 and superimposes the background layer 56 on the front surface of the three-dimensional object image 52 (step S570). The CPU of the three-dimensional map display device 100 then obtains the character data from the map database 10 with respect to features displayed in the three-dimensional object image 52 and adequately draws characters on the three-dimensional object image 52 after superimposition of the background layer 56 on the front surface thereof, according to the contents of the character data 14 (step S580), and displays a resulting three-dimensional map MAP on the display unit 60 (step S590). This series of processing outputs the three-dimensional map MAP according to the modification shown in FIG. 11.

Drawing the characters lastly avoids the characters from being hidden by the opaque portion of the background layer.

C2. Modification 2

The background image data generation device 200A may additionally have a date and time obtaining section that obtains the current date and time. In this application, the background image data generation device 200A may change the background image according to the current date and time. For example, the color tone of the background may be changed according to the current time, or the color of the mountains may be changed according to the season. This improves the reality of the three-dimensional map MAP.

C3. Modification 3

The first embodiment described above generates the three-dimensional object image 52, such that part of the three-dimensional object image 52 is covered and hidden by the opaque portion 56b of the background layer 56. The second embodiment described above generates the background image data 16, such that part of the three-dimensional object image 52 is covered and hidden by the opaque portion 56b of the background layer 56. The invention is, however, not limited to these embodiments. A modification may generate both the three-dimensional object image 52 and the background image data 16, while making adjustments, such that part of the three-dimensional object image 52 is covered and hidden by the opaque portion 56b of the background layer 56.

C4. Modification 5

The above embodiments describe the applications of the three-dimensional image output device and the background image generation device of the invention to the three-dimensional map display system. The invention is, however, not limited to these embodiments but may be applied to a navigation system that utilizes a three-dimensional map MAP to guide a route.

The invention is also applicable to output images other than the map. For example, in the case of displaying a three-dimensional CAD model of an automobile, the background of the automobile may be displayed by a background layer to express a pseudo-image showing the running state of the automobile. A background layer showing a driver and passengers may be superimposed and drawn on the front surface of the automobile image to express a pseudo-image in the state that people are on the automobile.

The invention is applicable to technology of outputting a three-dimensional image, in which a background image is superimposed on an image expressing an object three-dimensionally.

What is claimed is:

1. A three-dimensional image output device that outputs a three-dimensional image in which an object is drawn three-dimensionally with a background thereof, the three-dimensional image output device comprising:

a three-dimensional model storage that stores a three-dimensional model representing a three-dimensional shape of the object, the three-dimensional model including map data representing three-dimensional shapes of ground surface and features;

a projecting section that uses the three-dimensional model and generates a projection which is a three-dimensional object image that expresses the object three-dimensionally;

a background layer generating section that generates a background layer representing the background located behind the object in a three-dimensional space, the background layer including a background image having a transparent portion and an opaque portion; and an image output controller that generates the three-dimensional image by superimposing the background layer in front of the three-dimensional object image contrary to an actual location of the background behind the object in the three-dimensional space, and outputs the three-dimensional image, the three-dimensional image being a three-dimensional map that expresses a geographical shape three-dimensionally, wherein at least one of a generating condition of the three-dimensional object image and a generating condition of the background layer is adjusted to cause the opaque portion of the background image to cover and hide part of the three-dimensional object image, wherein the background image has the opaque portion in an upper part of the background image, and the transparent portion in a lower part of the background image, wherein a boundary between the transparent portion and the opaque portion is expressed by a circular arc or an elliptical arc connecting a left side and a right side of the background image, the opaque portion showing the stratosphere of the earth, and wherein the projecting section generates the three-dimensional object image having the part covered and hidden by the opaque portion from a viewpoint position where a horizon is to be recognized as a curved line.

2. The three-dimensional image output device according to claim 1, wherein the background image further includes:
  a transparent gradation area that gradually changes a degree of transparency thereof across a boundary between the transparent portion and the opaque portion.

3. A background image generation device that generates a background image for a three-dimensional image in which an object is drawn three-dimensionally with a background thereof, the three-dimensional image being a three-dimensional map that expresses a geographical shape three-dimensionally and includes a ground surface and features, the background being located behind the object in a three-dimensional space, the background image including a transparent portion through which an image is seen and an opaque portion which blocks a view, the background image generation device comprising:
  an object drawing range input section that inputs information specifying an object drawing range for drawing the object three-dimensionally as a three-dimensional object image on which the background image is to be superimposed;
  a background specifying information input section that inputs information specifying a content of the background of the three-dimensional object image in the three-dimensional image; and
  a background image generator that generates the background image by forming the opaque portion which covers and hides part of the object drawing range with the specified content of the background, while forming the transparent portion with a residual area of the opaque portion, the background image being superimposed in front of the three-dimensional object image contrary to an actual location of the background behind the object in the three-dimensional space, wherein the background image has the opaque portion in an upper part of the background image, and the transparent portion in a lower part of the background image, wherein a boundary between the transparent portion and the opaque portion is expressed by a circular arc or an elliptical arc connecting a left side and a right side of the background image, the opaque portion showing the stratosphere of the earth, and wherein the projecting section generates the three-dimensional object image having the part covered and hidden by the opaque portion from a viewpoint position where a horizon is to be recognized as a curved line.

4. A three-dimensional image output method performed by a computer to output a three-dimensional image in which an object is drawn three-dimensionally with a background thereof, the three-dimensional image output method comprising:
  storing a three-dimensional model representing a three-dimensional shape of the object, the three-dimensional model including map data representing three-dimensional shapes of ground surface and features;
  generating, from the three-dimensional model, a three-dimensional object image that expresses the object three-dimensionally;
  generating a background layer including a background image for the three-dimensional image, the background image having a transparent portion and an opaque portion; and
  superimposing the background layer with the three-dimensional object image by arranging the background layer in front of the three-dimensional object image contrary to the a location of the background behind the object in the three-dimensional space, thereby generating the three-dimensional image which is a three-dimensional map that expresses a geographical shape three-dimensionally; and
  outputting the three-dimensional image, wherein at least one of respective conditions for generating the three-dimensional object image and generating the background layer is adjusted to cause the opaque portion of the background image to cover and hide part of the three-dimensional object image, wherein the background image has the opaque portion in an upper part of the background image, and the transparent portion in a lower part of the background image, wherein a boundary between the transparent portion and the opaque portion is expressed by a circular arc or an elliptical arc connecting a left side and a right side of the background image, the opaque portion showing the stratosphere of the earth, and wherein the projecting section generates the three-dimensional object image having the part covered and hidden by the opaque portion from a viewpoint position where a horizon is to be recognized as a curved line.

5. A background image generation method performed by a computer to generate a background image for a three-dimensional image in which an object is drawn three-dimensionally with a background thereof, the three-dimensional image being a three-dimensional map that expresses a geographical shape three-dimensionally and includes a ground surface and features, the background being located behind the object in a three-dimensional space, the background image including a transparent portion through which an image is seen and an opaque portion which blocks a view, the background image generation method comprising:
  inputting information specifying an object drawing range for drawing the object three-dimensionally as a three-dimensional object image on which the background image is to be superimposed in the three-dimensional image;
  inputting background specifying information specifying a content of the background of the three-dimensional object image in the three-dimensional image; and
  generating the background image by forming the opaque portion which covers and hides part of the object drawing range with the specified content of the background, while forming the transparent portion with a residual area of the opaque portion, the background image being arranged in front of the three-dimensional image contrary to a location of the background behind the object in the three-dimensional space, wherein the background image has the opaque portion in an upper part of the background image, and the transparent portion in a lower part of the background image, wherein a boundary between the transparent portion and the opaque portion is expressed by a circular arc or an elliptical arc connecting a left side and a right side of the background image, the opaque portion showing the stratosphere of the earth, and wherein the projecting section generates the three-dimensional object image having the part covered and hidden by the opaque portion from a viewpoint position where a horizon is to be recognized as a curved line.

* * * * *